May 15, 1928.
L. R. CROUCH
EXPANSION JOINT
Filed March 8, 1926
1,670,023
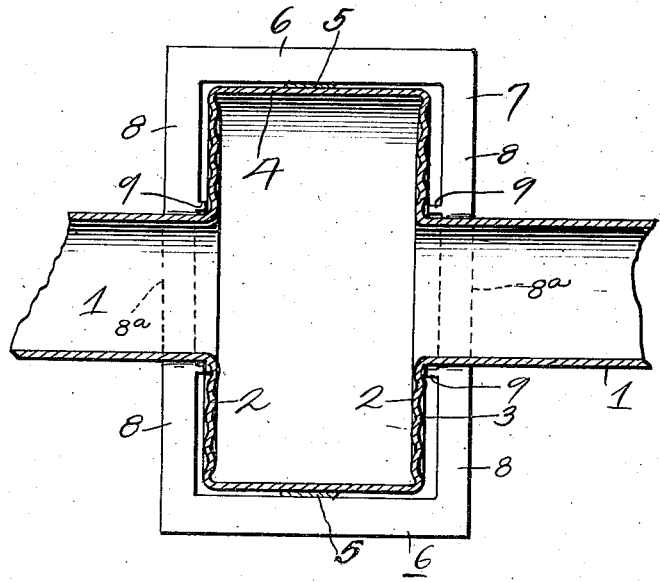
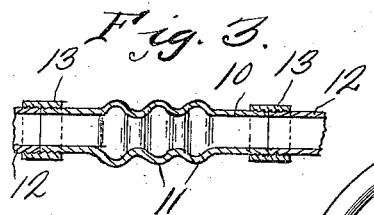
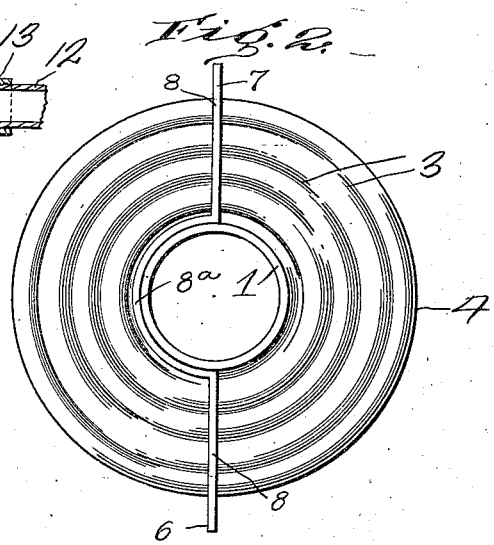
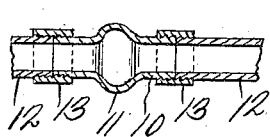
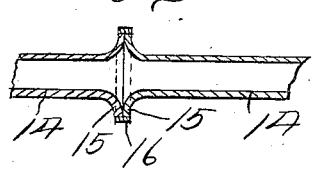
Inventor
L. R. Crouch
By Philip A. H. Ferrell
Attorney Patented May 15, 1928.

UNITED STATES PATENT OFFICE.

1,670,023

LOGAN R. CROUCH, OF NATCHEZ, MISSISSIPPI.

EXPANSION JOINT.

Application filed March 8, 1926. Serial No. 93,178.

The invention relates to expansion joints for pipe lines, and has for its object to provide a device of this character formed from a flexible or ductile material, and comprising axially alined pipe sections connected together by an enlarged cylindrical member, to the opposite walls of which the pipe sections are connected and which walls are provided with concentric corrugations, which allow the walls to bulge inwardly or outwardly upon contraction or expansion of the pipe line.

A further object is to provide the enlarged cylindrical member with a yoke, to the opposite sides of which the cylindrical member is secured, and which yoke is provided with stop lugs in spaced relation to the corrugated walls of the cylindrical member and forming means for limiting the outward movement of the walls whereby upon contraction the full force will not be received by the same expansion joint but by other expansion joints in the pipe line as a whole.

A further object is to provide an expansion joint comprising a pipe section having a plurality of circumferentially arranged ribs or corrugations adapted to give upon expansion or contraction of the pipe incident to heat or cold.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a vertical longitudinal sectional view through the expansion joint.

Figure 2 is a side elevation of the expansion joint showing the yoke applied thereto.

Figure 3 is a vertical longitudinal sectional view through a modified form of expansion joint, showing a plurality of convolutions.

Figure 4 is a sectional view through a further modified form showing a single corrugation.

Figure 5 is a vertical longitudinal sectional view through a further modification.

Referring to the drawing, the numeral 1 designates adjacent axially alined pipe sections, the inner ends of which terminate in spaced walls 2, which walls are provided with a plurality of concentric corrugations 3, which allow the walls to collapse inwardly or outwardly according to the expansion or contraction in a pipe line. The walls 2 are connected together by the annular member 4, which is relatively large in relation to the pipe sections 1 and are preferably formed integral with the walls 2, and hold the outer edges of the walls 2 against movement during the inward and outward movement of said walls. Although only one expansion joint is shown, it is to be understood any number may be placed in a pipe line as desired. The cylindrical member 4 is secured by means of solder or welding to the horizontal portions 6 of U-shaped brackets 7, the arms 8 of which overlie the outer sides of the walls 2 in spaced relation thereto and are provided with stop lugs 9, which are in spaced relation to the outer side of the walls 2 and form stops against which the walls 2 engage for limiting the outward movement of the pipe sections 1 whereby the contraction of a pipe line will be taken up by other means, for instance some other expansion joint and all of the expansion or contraction will not be on the same joint. This is particularly desirable where the device is used in connection with a relatively long pipe line. The walls 2 are preferably formed from a pliable or ductile material, for instance as brass or copper, however it is to be understood that they may be formed if so desired from any kind of material and applicant does not limit himself to the particular material. The arms 8 are connected together by means of semi-circular shaped members $8^a$ which members arch the sides of the pipe ends 1.

Referring to Figure 3 wherein a modified form is provided the coupling device is provided with a plurality of annular corrugations 11 extending entirely around the same, which are adapted to collapse or pull apart according to the expansion or contraction. In this form the ends of the coupling device are connected to adjacent pipe sections 12 by means of threaded sleeves 13. In Figure 4 the structure is substantially the same as shown in Figure 3, except only one circumferential corrugation is used on the coupling 10, otherwise the construction and operation is the same as that shown in Figure 3.

Referring to Figure 5 the adjacent pipe ends 14 are provided with flaring flanges 15 which engage each other and are secured together by means of an annular member 16 which is preferably brazed to the outer edges of the flanges 15. In this form the flanges 15 contract during the expansion and contraction and the structure is particularly adapted for use where there is a limited amount of expansion and contraction.

From the above it will be seen that an expansion joint is provided for pipe lines wherein oppositely disposed corrugated flexible walls are utilized for allowing expansion and contraction of the pipe lines for relieving the strain on the fittings thereof and a yoke is provided which will limit the outward movement of the walls, thereby allowing the strain to be taken up by other expansion joints similarly constructed and preventing all of the strain from coming on a single expansion joint in a pipe line.

The invention having been set forth what is claimed as new and useful is:—

The combination with an expansion joint comprising a cylindrical member having oppositely disposed collapsible walls to which pipe ends are connected in axial relation, of U-shaped yokes arching opposite sides of the cylindrical member, said yokes being anchored at opposite sides of the cylindrical member, the arms of said yokes extending inwardly towards each other adjacent the collapsible walls, members carried by said arms and extending towards the collapsible walls and forming limiting means for said walls in one direction, the adjacent ends of said arms being connected together by members arching the pipe ends.

In testimony whereof I hereunto affix my signature.

LOGAN R. CROUCH.